No. 887,362. PATENTED MAY 12, 1908.
A. WARFIELD.
RAILWAY TRUCK.
APPLICATION FILED MAY 19, 1906.

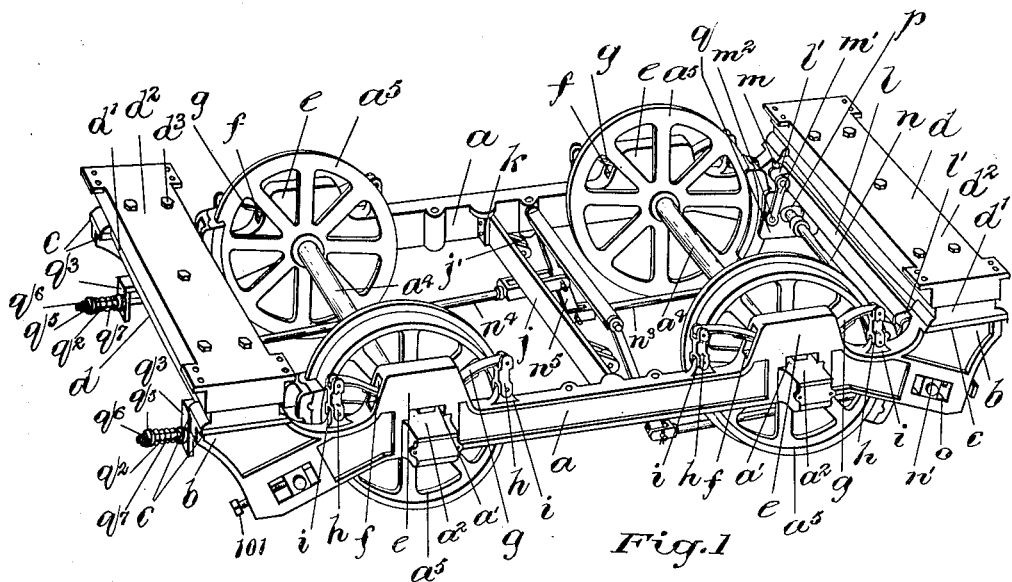

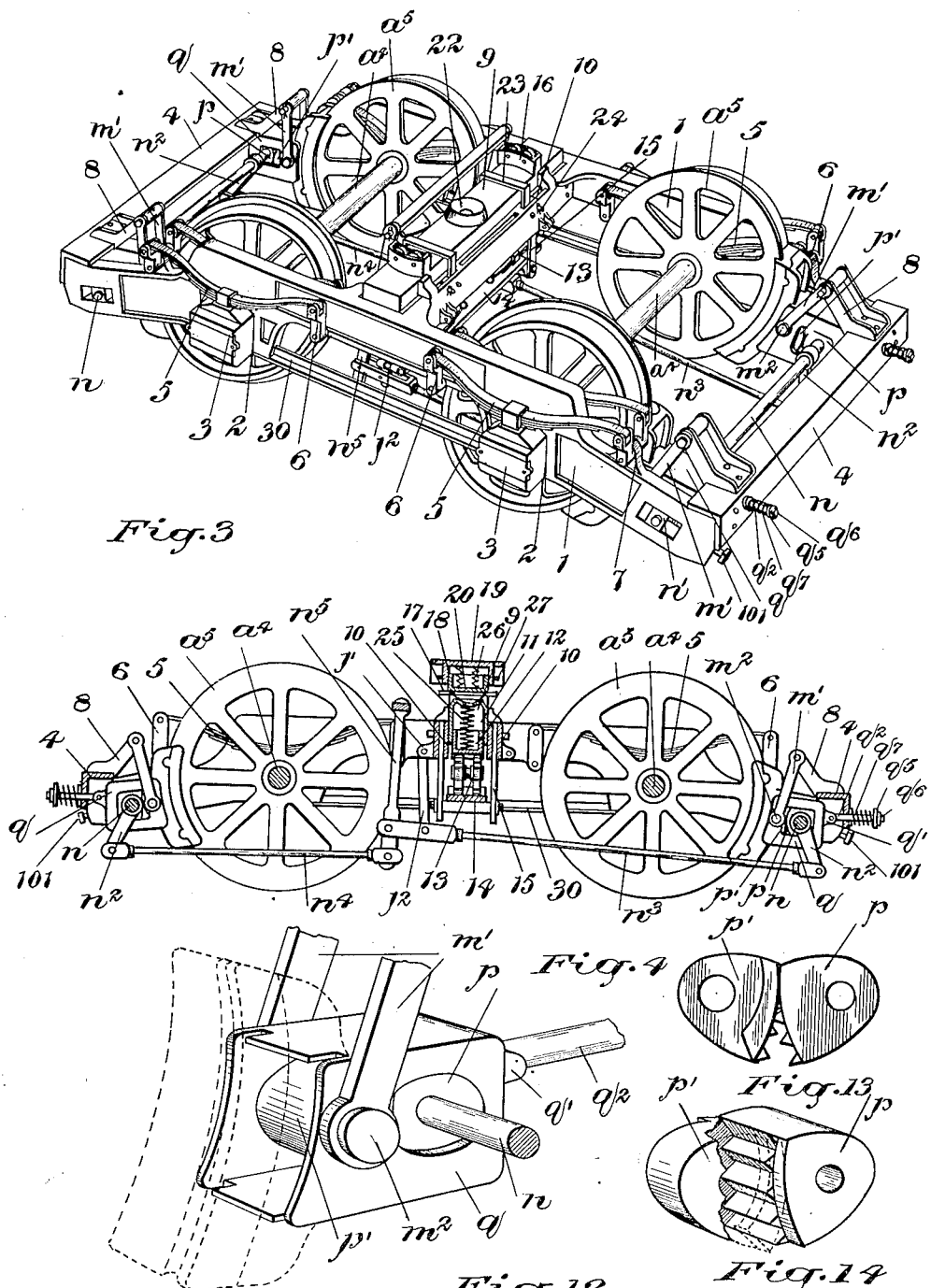

4 SHEETS—SHEET 3.

Witnesses
M. M. Swift
G. N. Gordon

Inventor
Aaron Warfield
by Smith Barnum
Attorney

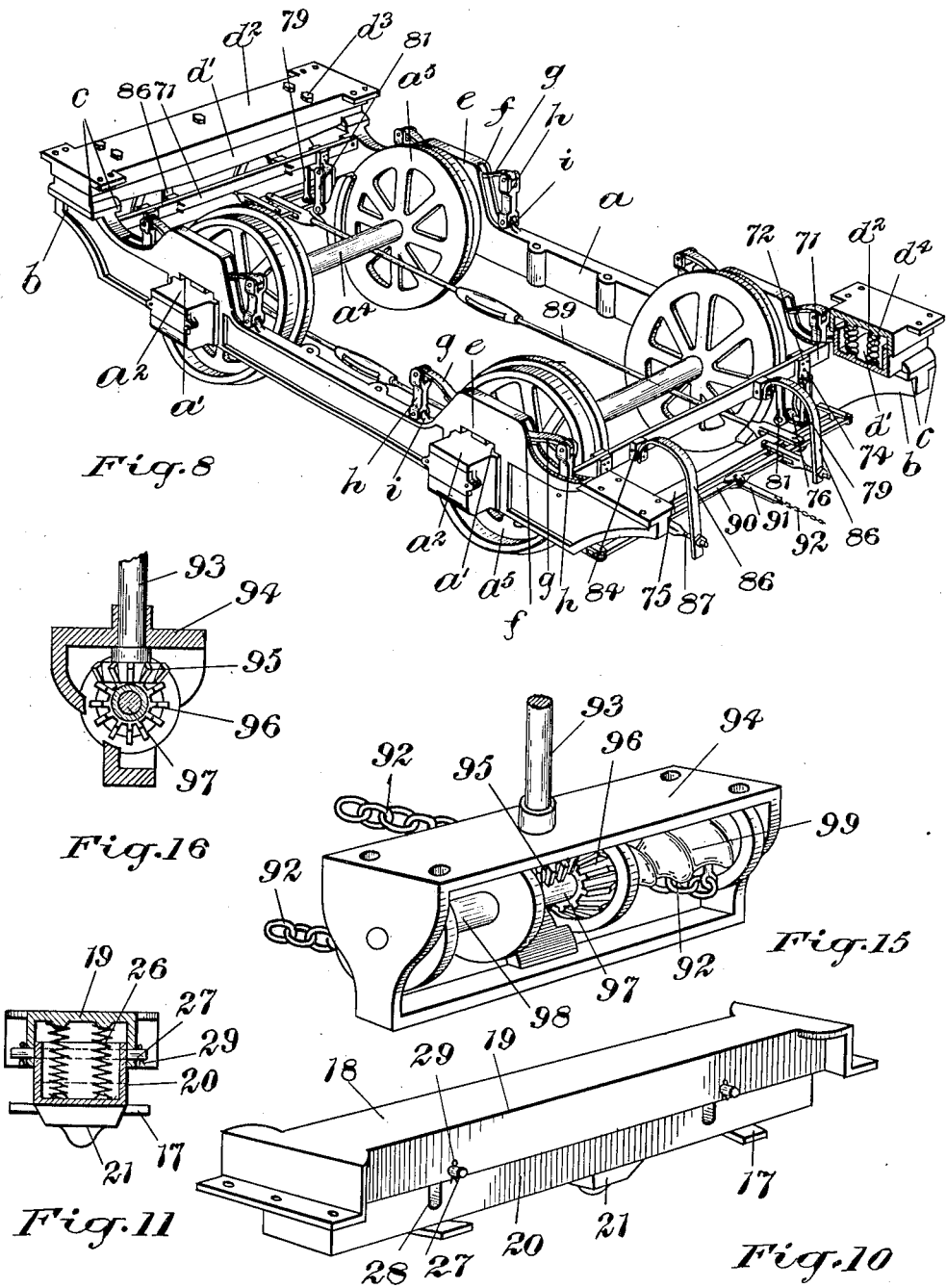

UNITED STATES PATENT OFFICE.

AARON WARFIELD, OF TORONTO, ONTARIO, CANADA.

RAILWAY-TRUCK.

No. 887,362.  Specification of Letters Patent.  Patented May 12, 1908.

Application filed May 19, 1906. Serial No. 317,827.

*To all whom it may concern:*

Be it known that I, AARON WARFIELD, a citizen of the United States of America, residing at Toronto, in the county of York, in the Province of Ontario, Canada, have invented a new and useful Improvement in Railway-Trucks, of which the following is a specification.

My invention relates to a railway truck adapted to street and steam railways; and the objects are to provide a truck with cast side frames, and eliminate as far as possible bolts and rivets in the construction of the frame.

I also provide sufficient springs between the journals and the frames to take up the direct jar and impact on the frame.

I further arrange in combination with the frames, spring cushion bolsters, to eliminate as far as possible the jar and impact between the truck and car body. The bolsters are so constructed and arranged in the frame of the truck that they act as cross beams and maintain the frame rigid.

I provide brakes in combination with the truck that the lost motion in bringing the shoes in contact with the wheels will be eliminated, and an instant contact with the wheel is effected, and I arrange the brake head in combination with a set of cam gears, one pivoted with the brake head and the other on the brake shaft, so that with the leverage braking force derived from the brake shaft, in combination with the cam gear braking action, by which the distance between the wheel and brake shoe is shortened, I obtain a very powerful brake.

Figure 6:
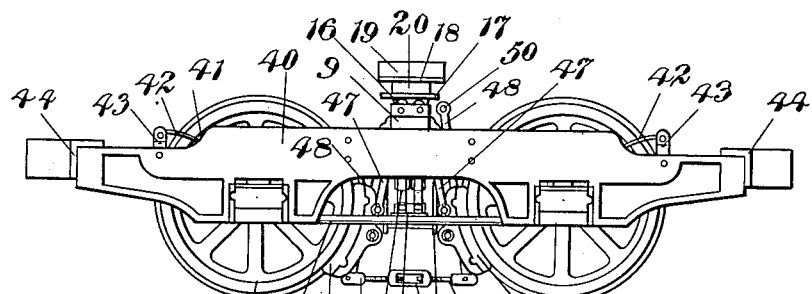
Figure 7:
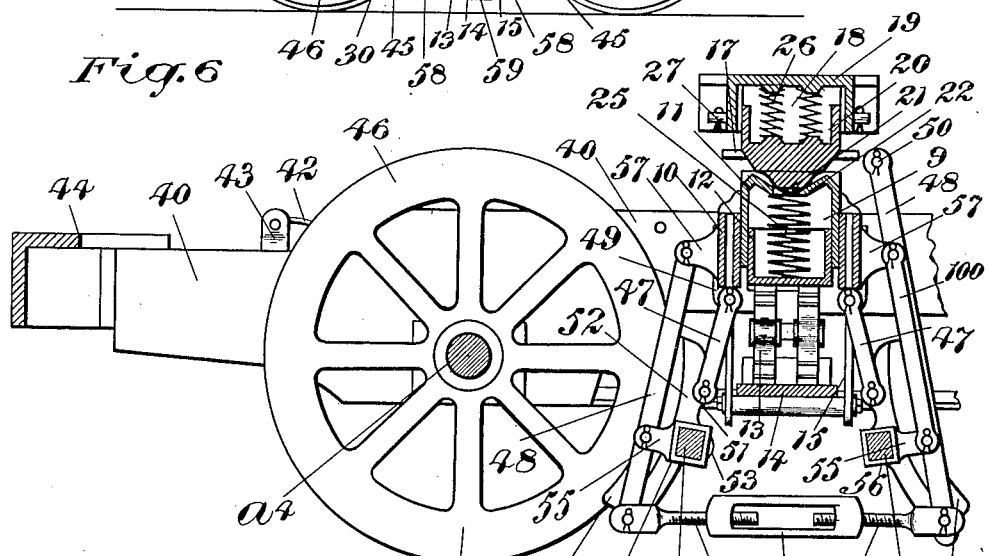
Figure 9:
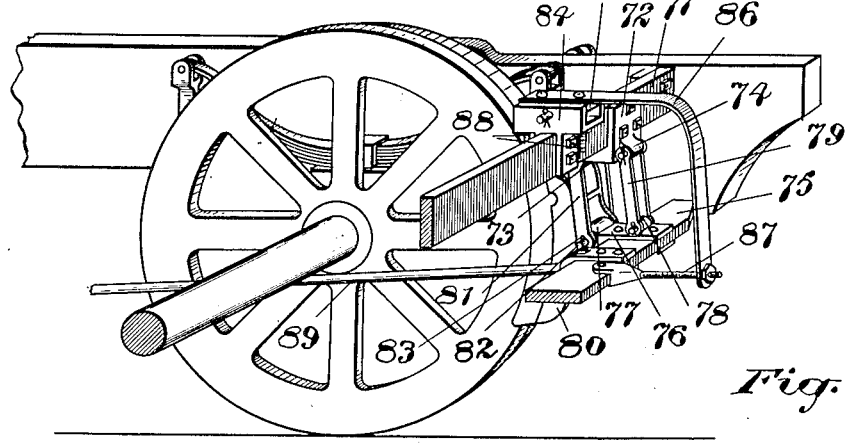

In the drawings:—Figure 1 is a perspective view of a truck for a single truck car; Fig. 2 is a sectional elevation of Fig. 1; Fig. 3 is a perspective view of a truck for a double truck car; Fig. 4 is a sectional elevation of Fig. 3; Fig. 5 is a side elevation of a truck for a short wheel base, Fig. 6 is a side elevation of an alternative form of truck for a short wheel base, Fig. 7 is a detail sectional elevation of Fig. 6; Fig. 8 is a perspective view of a single truck with an alternative form of brake hangers; Fig. 9 is a sectional perspective detail of an alternative form of Fig. 8; Fig. 10 is a perspective view of the cushion bolster for car body; Fig. 11 is a cross section through Fig. 10; Fig. 12 is a perspective view of the gear case and sections of the hangers; Fig. 13 is an elevational view of the cam gears removed; Fig. 14 is a perspective view partially in section of the eccentric cam gears; Fig. 15 is a perspective view of the brake staff connection; and Fig. 16 is a cross sectional view through Fig. 15.

Like letters refer to like parts throughout the drawings and specifications.

$a$—$a$ designates the side frames of the truck, cast in one piece, and having formed at each end a shoulder $b$, provided with laterally extending flanges $c$, to which may be bolted the bolster $d$, and provided in its under edge with cut-away sections $a'$ adapted to receive the journal boxes $a^2$.

Formed on the upper edges of the side frames are spring extensions $e$, one immediately above each of the journal box sections $a'$, and formed in each of the sections are recesses $f$ adapted to receive the journal springs $g$. Each of the journal springs $g$ engage with the top part of the journal box which projects into the recess; the outer ends of the springs extend beyond the sides of the spring extensions $e$, and are fastened to clevises $h$ pivotally connected to lugs $i$ formed on the top edges of the side frames, one on each side of the spring extension.

$j$ designates a center brace bar extending across the truck, and fastened to brackets $k$, formed on the inner faces of the side frames, and extending across the truck at each end are brace bars $l$, fastened to brackets $m$, formed on the inner faces of the side frames.

Formed on the center brace bar are lugs $j'$, to which the brake hangers are fastened, and formed on the brace bars $l$ are lugs $l'$, to which are fastened the brake links $m'$, which carry the brake head, brake shoes, and the gears and gear case.

$n$ designates the brake shaft journaled in boxes $n'$ carried in inclined guide ways $o$, formed in the side frames.

Carried on each end of the brake shaft is an eccentric gear section $p$, adapted to engage with a corresponding gear section $p'$, pivotally connected with the brake head. Surrounding the gears and part of the brake head is a gear case $q$, carried by the brake links $m'$ and passing through the ends of the links, gear case and lugs formed on the back of the brake head, is a pivot bolt $m^2$.

Formed on the back face of the gear case $q$ are lugs $q'$, and pivotally connected with the lugs is a release bolt $q^2$, which projects through an angle bracket $q^3$ depending from a brace bar $q^4$, extending across the ends of the truck from the side frames $a$—$a$. Located on the outer end of the release bolt between the angle bracket $q^3$, and a washer $q^5$, retained by a nut $q^6$, is a spiral tension spring $q^7$, adapted to allow the necessary movement to the gear case and parts when the brake is being applied.

Keyed on the brake shaft $n$ are crank arms $n^2$, coupled with the brake rods $n^3$, by which the brake shaft is rocked. Pivotally connected to the lugs $j'$ are the brake hangers $j^2$, having their opposite ends pivotally connected to the brake rod $n^4$, engaging with the crank arms on the crank shaft $n^2$, at the opposite end of the truck from the rods $n^3$.

$n^5$ designates a lever arm pivotally connected with the rods $n^3$ and $n^4$ by which the two rods may be drawn towards one another by a fulcrum created by the arrangement of coupling.

The bolster $d$ comprises in construction an outer and inner case, the inner case $d'$ being fastened directly to the side frames $a$—$a$, and acts as a brace for the ends of the truck. The outer case $d^2$ is held in engagement with the inner case by a series of bolts $d^3$ adapted to pass through the two sections. Contained within the two sections of the bolster, are a series of coiled springs $d^4$, held in position by a series of bosses or pins formed on the inner faces of the top and bottom parts of the inner and outer cases respectively. The springs $d^4$ within the bolster take up the jar of the car body between the car body and the truck when passing over crossings and curves.

Set in the journal boxes $a^2$ are the ends of the axles $a^4$, on which are mounted the carrying wheels $a^5$, which are in all respects similar to those in common use.

The truck illustrated in Figs. 1 and 2 is particularly adapted to single truck cars.

Each brake shoe is arranged in combination with a gear case $q$ and set of gears $p$ and $p'$. The gears are constructed on the cam principle, and as the brake shaft is rocked it causes the gears to ride up on themselves by the engagement of the teeth formed on their eccentric faces, and cause a wedging action, by increasing the distance of centers between the brake shaft and brake head.

In Fig. 3 I have shown a truck specially adapted for double truck cars, in which;—1 designates the side frames of the truck, and formed in the underside of the frames are cut-away sections 2 adapted to receive the journal boxes 3, for the main axles. The ends of the side frames are held together by angle irons 4, bolted to brackets formed on the inner side faces of the side frames. Instead of setting the journal springs 5 in recesses formed in the side frames as shown in Fig. 1, the springs are fastened to the top faces of the journal boxes, and the ends are pivotally fastened with clevises 6 pivotally connected to lugs 7 formed on the top faces of the side frame. In this truck I show two springs for each journal box, one on each side of the frame. The brake shaft $n$ is journaled in boxes $n'$ in the side frames 1 in a manner similar to that shown and described in Fig. 1. The brake links $m'$ are carried by a bracket 8 bolted to the upper face of the angle irons 4. The links, brake head, gear case, gears and all of the parts constituting the brake, and braking motion being similar to that described in Fig. 1. Instead of showing a bolster at each end of the truck as I have shown in Fig. 1, I show a bolster 9 carried by a cross-plate 10, extended across the center of the truck and being fastened to brackets projecting from the inner side faces of the sides of the frame. The bolster 9 consists of an outer and inner case 11 and 12 respectively, the inner case being mounted on elliptical springs 13, supported on a metal plate 14 carried by hangers 15, the upper ends being pivoted in between the cross-plates 10. On the top face of the outer-case 11 at each end are roller bearings 16, adapted to engage with rubbing irons 17 formed on the under face of a bolster 18, adapted to be fastened to the underside of the car body. The bolster 18 consists of the outer and inner case 19 and 20 respectively, and formed on the underside of the inner case 19 is a pivot block 21, adapted to engage in a counter sunk pivot seat 22. Passing through the two bolsters to maintain them in their relative assembled position will be the usual king bolt. 23 designates a tie strap passing over and down the sides of the outer case 11 of the bolster 9, the ends engaging in between the cross-plates 10 where they are held by bolts 24. The straps 23 hold the bolster in its relative position in the cross-plates and prevent misplacement from jar and jolt. Contained within the bolsters 9 and 18 are a series of coil springs 25 and 26 respectively, to cushion the bolsters and obviate impact between the car body and the truck frames. The outer and inner cases of the bolsters 9 and 18, respectively, are held together by bolts 27 passing through them crosswise. The inner case being provided with a slot 28 to allow the bolt to ride in when the bolster is being depressed. In the bolster 18 the fastening bolt 27 projects beyond each side, and is held in position by cotter pins 29. In the bolster 9, the fastening bolt will come flush with the outside face of the outside case, so as not to interfere with the cross-plates 10 by which the bolster is held. I may arrange in the contact faces of the outer cases with the inner cases, roller bearings to obviate friction and binding. Extending across the open bottom of the side bars 1, are stay bars 30, the ends engaging in slots formed in the under edge of the side bars, and are held in position by suitable bolts or rivets.

Fig. 5 shows a modification of Fig. 3. In this truck the brake and bolster parts are the same as in the former, the essential difference being in the journal springs 60, which are set in pockets formed in the side frames 1. In Fig. 6 I show an alternative form of truck and brake hangers; the truck in this case is specially adapted for a double truck car. The side frames 40 are cast in one piece and in a similar form to that of the former figures. The bolsters are in all respects the same, and are fastened in the truck by cross-plates 10 in a similar manner. Formed in the side frame 40 are spring pockets 41, in which are pivoted one end of each of the journal springs 42, the opposite end projecting from the pocket and is pivoted to a clevis 43 pivoted to the frame. The ends of the side frames are held together by angle plates 44, bent outwards to provide sufficient space between the inner edges and the axle to receive the motor. The brake shoes 45 are arranged to engage on the carrying wheels 46, on the two inner faces, and the braking pressure is effected by an outward movement of the brake shoes. Each of the brake shoes 45 is suspended by a short carrying link 47, and a lever link 48, one end of the carrying link 47 being bolted to a lug 49 formed on the face of the cross-plates 10, and the other end is bolted to a lug 51 formed on the back edge of the brake head 52. Extending across the truck, and with the ends passing through lugs 53 formed on the back edge of the brake head 52 are square brake beams 54, adapted to maintain the brake heads apart, and also to act as a fulcrum for the lever links 48. The lever links 48 on one half of the brake extend from lugs 57, formed on the side faces of the cross-plates 10, down through and pivoted with lugs 55 extending from a collar 56 surrounding the brake beams 54. The lever link 48 extends slightly below the lugs 55, and is coupled with the end of a brake rod 58. The opposite half of the brake is provided with the carrying link 47, but the lever link extends upwards beyond the lugs 57, but it is not pivoted therein. The lower end is pivoted to lugs 55, extending from a collar 56, surrounding the brake beam 54, the same as in the other half. Extending from the lugs 57 to the lugs 55, are supplementary links 100, to substitute for the lever link, and act as additional hangers in the event of the operating lever link breaking. The end of the lever link extends down below the lugs 55, and is coupled to the end of a brake rod 58, the two brake rods being coupled together by a turn-buckle 59, by which they may be adjusted. Fastening the top ends of the lever links 48 together is a coupling bar 50, to which the sway bar may be fastened.

In Fig. 9 I show a modification of the brake hangers and connections, whereby the pressure of the brake is effected by a direct pull. Bolted to a brace bar 71, extending across the ends of the truck from side to side, is a bracket 72 having lugs 73 and 74 formed on its front and back face. 75 designates a brake beam, and bolted to the brake beam are brackets 76, formed with a forwardly projecting lug 77 and an upwardly projecting lug 78. Connecting with the lugs 74 and 78 are hanger links 79, fastened to the respective lugs by bolts, which are held in position by cotter pins. The lugs 77 of the bracket engage with the brake head 80, and connecting the lugs 73 with the lugs 77, are hanger links 81. The hanger links 81, brake head 80, and lugs 77 are held in combination by a bolt 82, held in position by a cotter pin 83. 84 designates an adjusting block, bolted to the brace bar 71, and pivotally connected to the braced block 84 is an adjusting plate 85. Bolted to the plate 85, is one end of a tension spring 86, the other end being fastened on the end of a connecting post 87, bolted to the brake beam 75. Passing through the adjusting block 84, and engaging with the adjusting plate 85, are adjusting screws 88, by which the tension of the spring 86 may be regulated. Bolted to the brake beam 75 is shown the usual brake rods 89.

In Fig. 8 I have shown a modified form of attaching the tension spring 86 to the brace bar; whereby the adjusting block 84 is bolted to the side of the brace beam instead of on top. I also, instead of connecting the brake rods 89 to the brake beam, connect it with a linked bar 90, pivotally connected, and arranged parallel with the brake beam. The linked bar 90 is coupled with a short link 91, to which is connected the end of the brake chain 92 connected with the brake staff. The brake staff 93, adapted to operate in conjunction with the truck, ends in a frame 94, adapted to be fastened to the underside of the car body. On the end of the brake staff 93, is a bevel gear 95, adapted to mesh with a bevel gear 96 keyed on a shaft 97, mounted in the frame 94. On the one end of the shaft 97 is a drum 98 to which is fastened one end of the brake chain 92, on the opposite end of the shaft is keyed a spiral drum 99, to which is fastened the opposite end of the brake chain. The shaft 97 will be rotated by the engagement of the gears, and the brake chain start to wind up on the drums to which the ends are connected, the end of the chain winding on the larger coil of the drum 99 will naturally wind up the greatest amount to the revolution, and as the greater pressure is reached, the less chain is being wound. By winding the chain on the coil drum I get a very rapid and steady winding of the chain, at the first turns of the brake staff. The drum 98 is only provided as an auxiliary, and a substitute for the drum 99 in the event of any of its respective parts breaking.

The trucks as I have shown and described them, are adapted to street cars especially, motor cars; but I do not wish to confine myself solely to trucks for street cars, as the same principle of trucks may be used in steam railways.

Fitted through the ends of the side frames, are adjusting bolts 101, adapted to engage with the journal boxes $n'$, in which are journaled the ends of the brake shafts $n$. The bolts 101 are for the purpose of adjusting the journal boxes in the guide ways $o$, to adjust the brake shaft, gears, brake head and brake shoes to the carrying wheels.

What I claim as new and desire to secure by Letters Patent is—

1. In a railway truck, cast metal side frames, journal box sections formed in said frames, spring extensions formed integral with said frames, recesses formed in said extensions, journal springs arranged in said recesses, clevises pivotally connecting the ends of said springs with lugs formed on said side frames, substantially as specified.

2. In a railway truck, cast metal side frames, journal box sections formed in said frames, spring extensions formed integral with said frames, recesses formed in said extensions, journal springs arranged in said extensions, clevises pivotally connecting the ends of said springs with lugs formed on said side frames, flanges formed on the ends of said side frames, bolsters fastened to the said flanges, said bolsters adapted to act as supporting braces across the ends of said truck, substantially as specified.

3. In a railway truck, cast metal side frames, lugs formed on the inside faces of said side frames, brace bars fastened to said lugs and extending across said truck, laterally extending lugs formed on the upper edges of the ends of said side frames, a bolster fastened to said lugs at each end of said truck, said bolster consisting of an inner and outer case, cushion springs arranged between said inner and outer cases, fastening bolts adapted to retain said outer case in compressible combination with said lower case, substantially as specified.

4. In a railway truck, cast metal side frames, laterally extending lugs formed on the upper ends of said side frames, bolsters extending across said truck, said bolsters fastened to said lugs, said bolsters consisting of an inner and outer case, cushion springs between said inner and outer cases, fastening bolts passing through said inner and outer cases, said bolts adapted to retain said outer case in compressible combination with said lower case, substantially as specified.

Signed at Toronto this 2nd day of April 1906.

AARON WARFIELD.

Witnesses:
GEO. GORDON.
M. M. SWIFT.